Feb. 23, 1954    G. R. RASMUSSEN    2,669,969
LIVESTOCK OILING APPARATUS
Filed Oct. 30, 1951    2 Sheets-Sheet 1
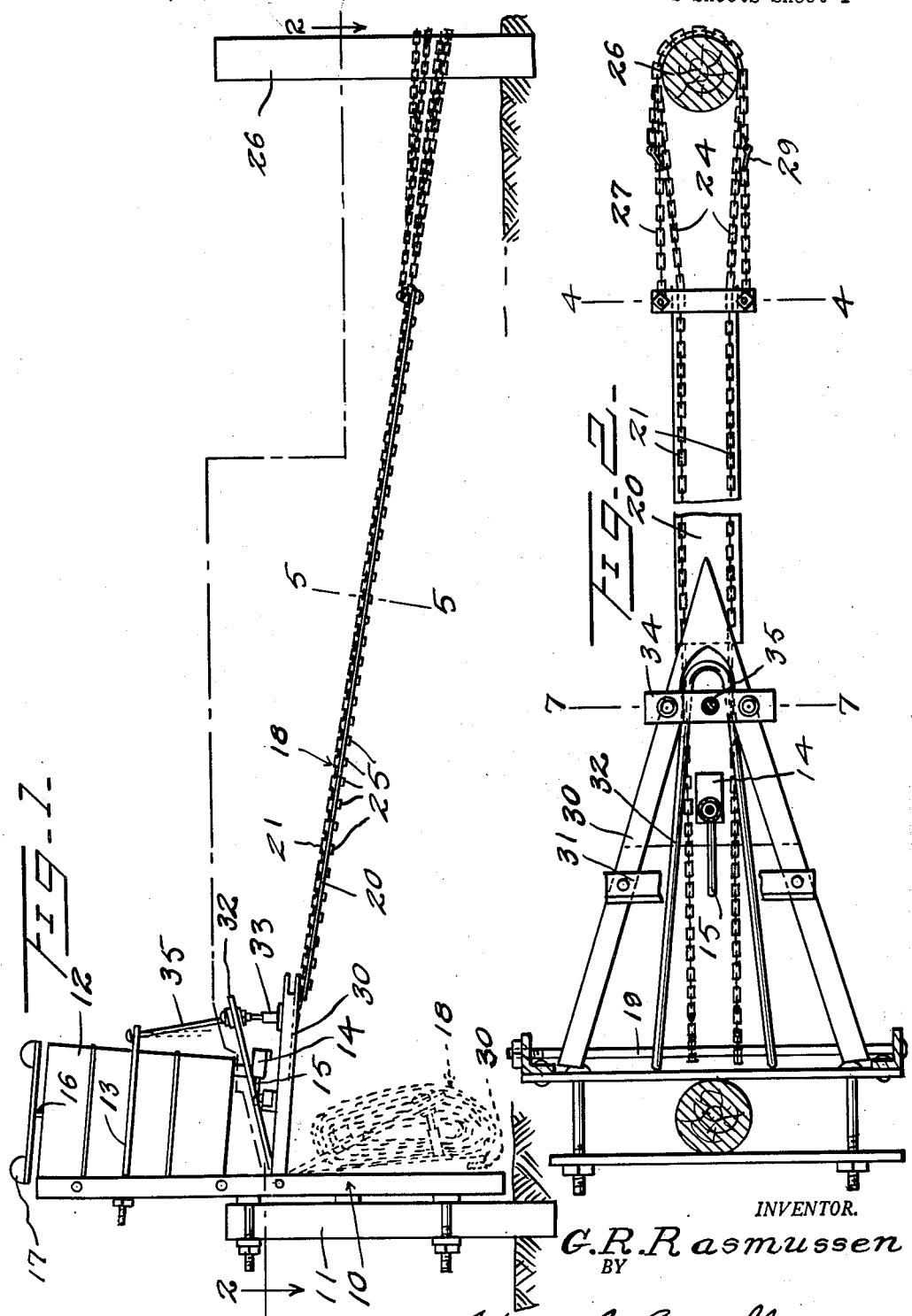
INVENTOR.
G. R. Rasmussen
BY
Kimmel & Crowell Attys.

Feb. 23, 1954 — G. R. RASMUSSEN — 2,669,969
LIVESTOCK OILING APPARATUS
Filed Oct. 30, 1951 — 2 Sheets-Sheet 2
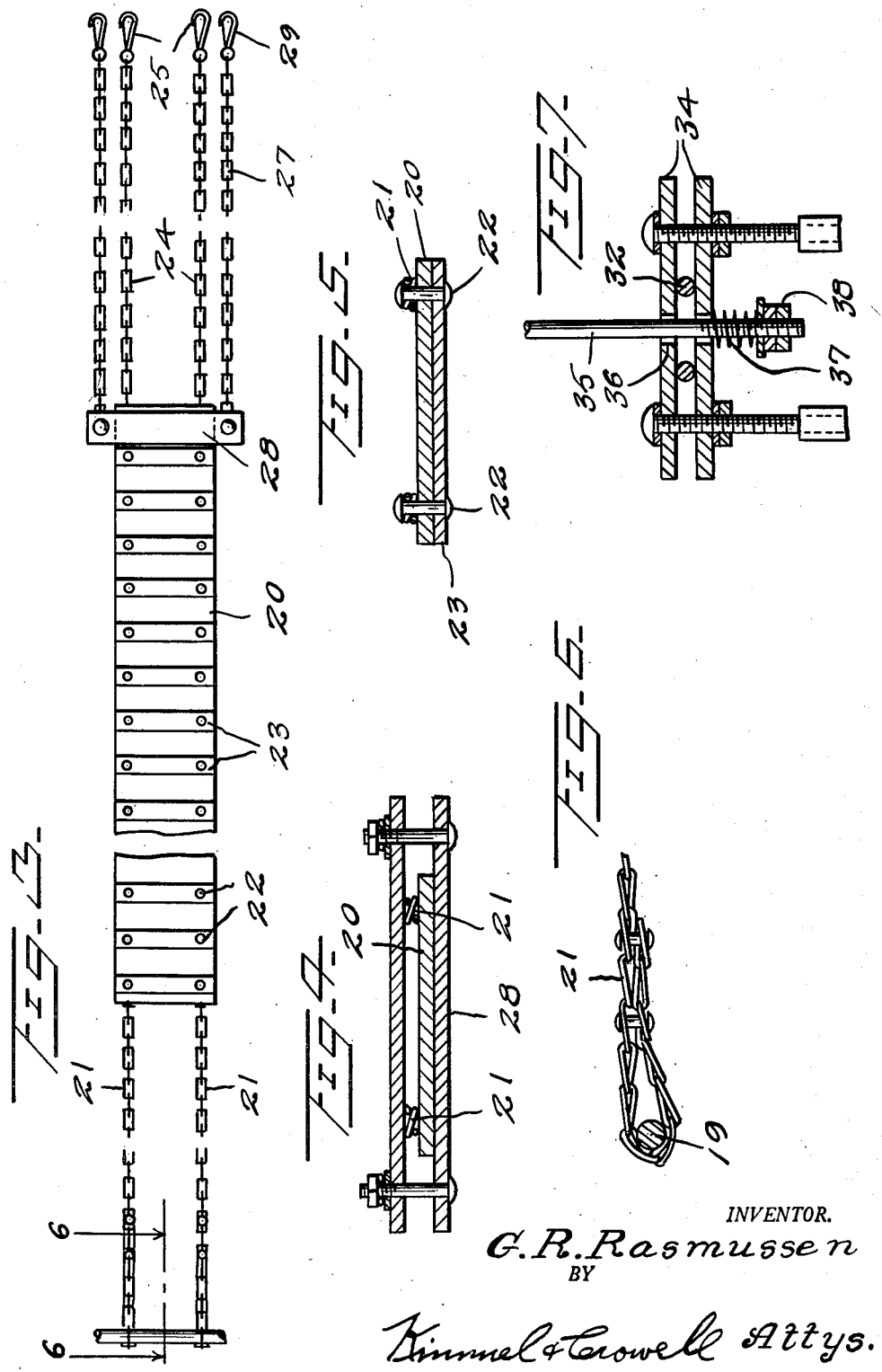
INVENTOR.
G. R. Rasmussen
BY
Kimmel & Crowell Attys.

Patented Feb. 23, 1954

2,669,969

UNITED STATES PATENT OFFICE 2,669,969

LIVESTOCK OILING APPARATUS

Gerald R. Rasmussen, Chappell, Nebr.

Application October 30, 1951, Serial No. 253,918

4 Claims. (Cl. 119—157)

This invention relates to a livestock oiling apparatus and is an improvement thereover.

An object of this invention is to provide in a livestock oiling structure, an improved belt which will not only provide for the transfer of oil to an animal, but will also provide an effective scratching or rubbing means against which the animal may rub.

Another object of this invention is to provide an improved livestock oiling belt which is formed of a flexible belt member with a pair of parallel chains fixed to the upper operative side thereof and extending from one end of the belt member for securing the belt to a post.

A further object of this invention is to provide an improved stock oiling belt including a pair of parallel chains fixed to one side thereof and a plurality of transversely disposed cleats fixed to the opposite side thereof to thereby provide a double rubbing surface.

With the above and other objects in view, my invention consists in the arrangement, combination and details of construction disclosed in the drawings and specifications, and then more particularly pointed out in the appended claims.

In the drawings,

Figure 1 is a detail side elevation of a livestock oiling apparatus constructed according to an embodiment of this invention.

Figure 2 is a sectional view taken on the line 2—2 of Figure 1,

Figure 3 is an enlarged bottom plan view of the belt,

Figure 4 is an enlarged sectional view taken on the line 4—4 of Figure 2,

Figure 5 is an enlarged sectional view taken on the line 5—5 of Figure 1,

Figure 6 is an enlarged fragmentary sectional view taken on the line 6—6 of Figure 3, Figure 7 is an enlarged fragmentary sectional view taken on the line 7—7 of Figure 2.

Referring to the drawings, the numeral 10 designates generally a supporting frame structure which is adapted to be secured to an upright post 11 which is extended into the ground. A reservoir or tank 12 is secured by fastening means 13 to the frame 10, and the tank or reservoir 12 has a valve 14 secured to the lower end thereof, which includes a valve operating lever 15. The interior of the tank or reservoir 12 has an agitator 16 disposed therein which is rotated by a wind-operated member 17.

A belt generally designated as 18 is disposed at one end below the reservoir 12. The belt 18 includes a flexible belt member 20 which has disposed on the upper side thereof a pair of chain members 21. The chains 21 at their inner ends project beyond the inner end of belt member 20 and are secured about a bolt 19 fixed between the vertical members of the frame 10. The chain members 21 are disposed in parallel relation closely adjacent the lengthwise edges of the belt member 20, and the chains 21 are secured to the upper side of the belt member 20 by means of fastening members 22 which extend through the belt member 20 and also through transversely disposed cleats or bars 23. The bars or cleats 23 are spaced apart lengthwise along the lower side of the belt member 20 and provide a means whereby the belt member 20 is held against twisting or contracting when the belt is engaged by an animal.

The two chain members 21 at their outer ends project beyond the outer end of the belt member 20, as indicated at 24, and the terminal ends of the extensions 24 have hooks 25 secured thereto so that the extensions 24 may be extended about an upright post 26 and the hooks 25 engage with the extensions 24.

A second pair of short chain members 27 are secured to the outer ends of a transversely disposed cleat or bar 28 which is secured to the outer end of the belt member 20, and the short chains 27 also have hooks 29 secured thereto which are adapted to secure the chains 27 about the post 26.

A V-shaped frame member 30 is rockably disposed on a shaft or bolt 19 overlying the upper side of the belt 18, and the frame member 30 has fixed between the forwardly convergent sides thereof a valve operating bar 31 disposed in a position to engage the valve lever 15. The frame 30 is held against undue upward movement by means of a V-shaped stop member 32 which has the divergent ends thereof rockably mounted on a shaft or bolt 19, and the convergent end of the V-member 32 is disposed above the forward end of the frame member 30 and is fixed in upwardly divergent relation with respect to the V-member 30 by means of a pair of bolts 33. The bolts 33 are extended through a pair of cross bars 34 which engage on the upper and lower sides of the stop member 32.

The frame member 30 and the stop member 32 are limited as to their downward swinging movement by means of an elongated rod 35 which is secured at its upper end to the fastening member 13. The rod 35 extends loosely through openings 36 formed in the bars 34, and a spring 37 engages about the rod 35 below the bars 34. The spring 37 provides a cushioning means to cushion the downward movement of the frame 30 and the stop member 32, and spring 37 is tensioned by means of a spring tensioning nut 38 threaded on the lower end of the rod 35.

In the use and operation of this device, the desired insecticide or liquid is disposed in the reservoir 12 and the valve 15 which overlies the belt 18 is normally disposed in a closed position. When an animal rubs against the belt 18, frame 30 will be rocked upwardly so that cross bar 31 will rock valve lever 15 upwardly to a valve opening position. The liquid will flow onto the upper side of the belt 18 and will run down between the parallel chains 21. As the animal rubs the belt 18, the liquid will be rubbed onto the animal so that the animal will be coated with an insecticide on each occasion that the animal rubs against the belt member 18. The chains 21 or the cleats 23 will provide a means for scratching or relieving the itching on the skin of the animal.

I do not mean to confine myself to the exact details of construction herein disclosed, but claim all variations falling within the purview of the appended claims.

What I claim is:

1. A stock oiler comprising a pair of upright spaced apart posts, a vertically disposed frame fixed to one of said posts, a flexible stock oiling belt fixed between said frame and the other of said posts and disposed at a downward inclination from said frame, and an oil discharging means carried by said frame above the end of the belt which is fixed to said frame and operatively connected to said belt for discharging oil onto said belt, said belt comprising a continuously relative wide elongated flexible belt member, a pair of chains disposed on one face of said member, and means securing said chains to said member each in a position adjacent one longitudinal edge of said member.

2. A stock oiler comprising a pair of upright spaced apart posts, a vertically disposed frame fixed to one of said posts, a flexible stock oiling belt fixed between said frame and the other of said posts and disposed at a downward inclination from said frame, and an oil discharging means carried by said frame above the end of the belt which is fixed to said frame and operatively connected to said belt for discharging oil onto said belt, said belt comprising a continuous relatively wide elongated flexible belt member, a pair of chains disposed on one face of said member, each chain having one end thereof projecting beyond the adjacent end of said member, hooks carried by the extending ends of said chains whereby said extending ends may be detachably secured to said posts, and means securing said chains to said member each adjacent one longitudinal edge of said member.

3. A stock oiler comprising a pair of upright spaced apart posts, a vertically disposed frame fixed to one of said posts, a flexible stock oiling belt fixed between said frame and the other of said posts and disposed at a downward inclination from said frame, and an oil discharging means carried by said frame above the end of the belt which is fixed to said frame and operatively connected to said belt for discharging oil onto said belt, said belt comprising a continuous relatively wide elongated flexible belt member, a pair of chains disposed one along each edge of the face of said member, a plurality of transversely disposed lengthwise spaced apart cleats on the opposite face of said member, and means securing said chains and cleats to said member.

4. A stock oiler comprising a pair of upright spaced apart posts, a vertically disposed frame fixed to one of said posts, a flexible stock oiling belt fixed between said frame and the other of said posts and disposed at a downward inclination from said frame, and an oil discharging means carried by said frame above the end of the belt which is fixed to said frame and operatively connected to said belt for discharging oil onto said belt, said belt comprising a continuous relatively wide elongated flexible belt member, a pair of chains disposed one along each edge of said member, a plurality of transversely disposed lengthwise spaced apart cleats on the opposite face of said member, means securing said chains and cleats to said member, a pair of short chains secured to one end of said member, and snap hooks carried by said short chains.

GERALD R. RASMUSSEN.

References Cited in the file of this patent

UNITED STATES PATENTS

| Number | Name | Date |
|---|---|---|
| 488,371 | Smith | Dec. 20, 1892 |
| 1,112,649 | Parr | Oct. 6, 1914 |
| 2,320,052 | Rodriguez | May 25, 1943 |
| 2,366,535 | Le Clair | Jan. 2, 1945 |
| 2,405,556 | Bogle | Aug. 13, 1946 |
| 2,581,028 | Kirk | Jan. 1, 1952 |
| 2,598,921 | Knudsen | June 3, 1952 |

FOREIGN PATENTS

| Number | Country | Date |
|---|---|---|
| 183,933 | Great Britain | Aug. 3, 1922 |